United States Patent [19]
Seymour

[11] 3,913,169
[45] Oct. 21, 1975

[54] RAKE DEVICE

[76] Inventor: Claude W. Seymour, 8401 Delido Road, Louisville, Ky. 40219

[22] Filed: Oct. 26, 1973

[21] Appl. No.: 410,289

[52] U.S. Cl. .................... 15/369; 15/142; 15/388; 15/402
[51] Int. Cl.[2] ........................................ A47L 9/04
[58] Field of Search ............ 15/369, 396, 397, 402, 15/388, 142

[56] References Cited
UNITED STATES PATENTS

| | | | |
|---|---|---|---|
| 1,228,176 | 5/1917 | Bishop | 15/369 |
| 3,733,646 | 5/1973 | Mein | 15/369 |
| 3,783,474 | 1/1974 | Fairaizl et al. | 15/369 |
| 3,795,938 | 3/1974 | Caporaso | 15/369 |

FOREIGN PATENTS OR APPLICATIONS

| | | | |
|---|---|---|---|
| 48,729 | 5/1934 | Denmark | 15/369 |

*Primary Examiner*—Harvey C. Hornsby
*Assistant Examiner*—C. K. Moore

[57] ABSTRACT

A rake device including a rake head adapted to carry a multiplicity of rows of teeth pivotably retained by the rake head. The pivotably secured teeth are disposed to extend from one side of the rake head, where means are provided to limit pivotal movement of the teeth from a first position on one side of a line transverse to a plane over which the rake is passed to a second position on the opposite side of said line in response to back and forth movement of the rake means over the surface to be raked.

Each row of teeth pivotably carried by the rake head and handle means can be attached to the rake head to facilitate movement of the rake head over the surface to be raked.

1 Claim, 4 Drawing Figures

U.S. Patent  Oct. 21, 1975  3,913,169
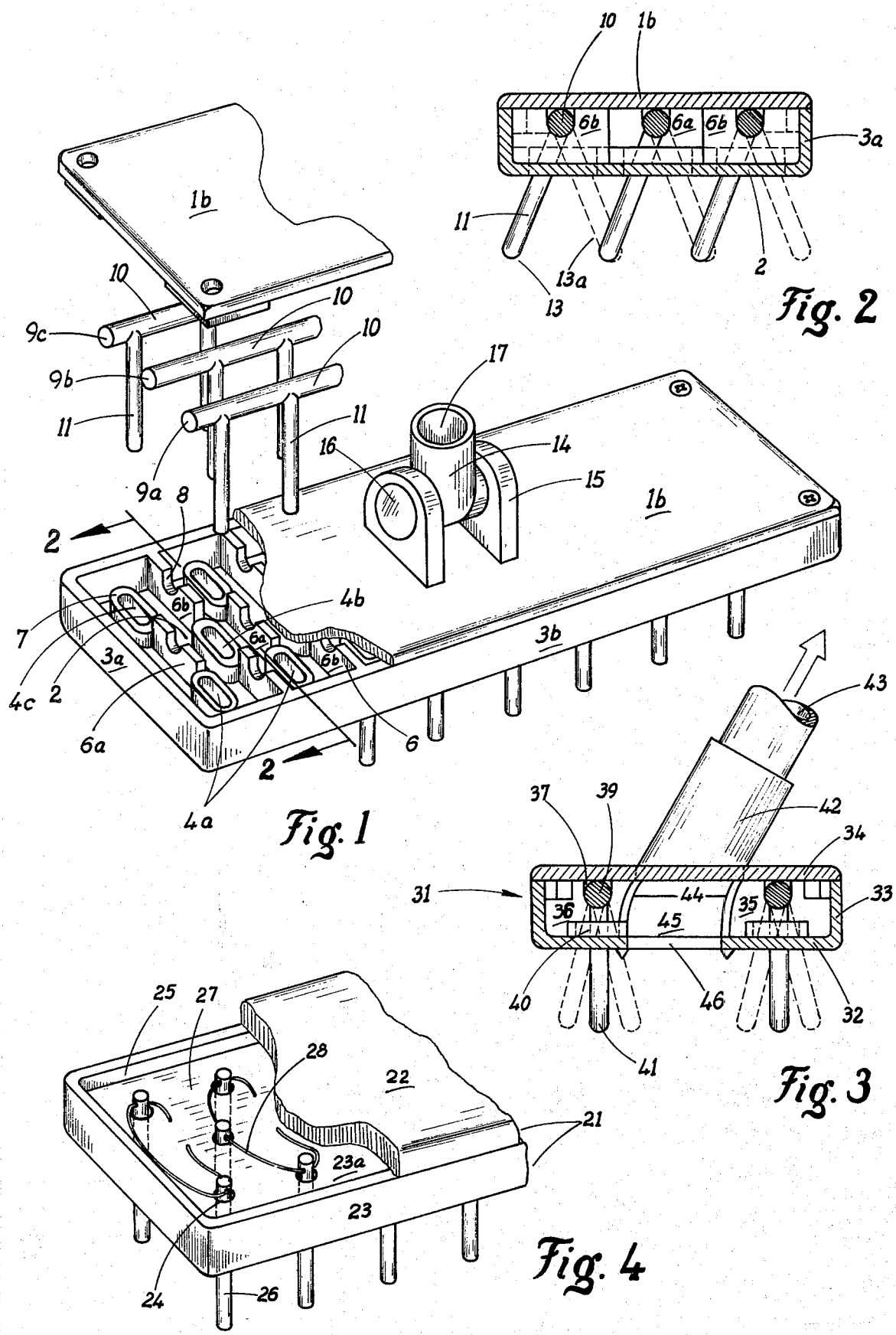

3,913,169

RAKE DEVICE

BACKGROUND OF THE INVENTION

The present invention provides an advantageous rake assembly, having pivotable teeth, which can be moved back and forth over a surface to be raked. It will be recognized that the rake provided by the present invention is particularly useful in connection with cleaning carpeted surfaces where the carpet has extremely long pile. The rake is also useful in other applications where it is desirable to loosen or remove foreign material disposed between a multiplicity of long strands in circumstances, where it is not desired to break the strands which may be intertwined.

Most previous rake devices have provided only a single row of teeth attached to a rake head, where the teeth are firmly attached to the head. Some other apparatus have provided rake teeth moveable in one direction in response to movement of the rake over a surface to be raked. Such devices have been provided with one end connected to a spring means provided to urge the teeth to a pre-selected position but the teeth are not pivotably disposed to move freely from one position to another in response to movement of the rake head. One such device, as shown in U.S. Pat. No. 1,493,292 to U. S. Sweeny, provides a rake which is not suitable to be moved back and forth over the surface to be raked because the teeth move only in response to movement of the rake in one direction.

In other devices, which likewise permit the rake to be moved only in a direction, usually toward the person using the rake, the rake teeth have been individually attached to a rake head to move in slots provided by the rake head. One such device is shown in U.S. Pat. No. 2,119,165, Hornstein, but the rake teeth are urged by spring means to be returned to a pre-selected position, and are moved from the selected position in response to contact with obstructions encountered in connection with movement of the rake toward the operator over the surface to be raked, and the rake is not freely moveable in two directions over the surface.

As will be seen from the following description, the present invention provides an advantageous rake means which can be moved back and forth over a surface to be raked.

More particularly, the present invention, can include an advantageous rake head adapted to pivotably retain at least one row of teeth, where the teeth can extend from the rake head through openings in one side of the rake head and where the diameter of each opening is greater than the diameter of the rake tooth extending through the opening so the size of the openings limit the degree of pivotal movement of the rake teeth. The rake means provided by the present invention further advantageously permits the rake to be passed back and forth over the surface to be raked without tearing the strands of material on the surface over which the rake passes.

Furthermore, the teeth in any row of teeth extending from the rake head can be adapted to move independently of the other teeth in the row or can be mounted so all of the teeth in the row move together as described more particularly hereinafter.

Moreover, the present invention further provides a rake head carrying at least one row of rake teeth pivotably retained by the rake head, wherein the rake head can be adapted to be connected to a vacuum source such as a vacuum cleaner, to remove material separated by the rake from the surface to be raked.

Other advantageous features will become obvious to those skilled in the art upon reading the disclosures set forth hereinafter.

DESCRIPTION OF THE DRAWINGS

FIG. 1 is an exploded view partly in section, of one example of a rake head in accordance with the present invention;

FIG. 2 is a view taken along a line passing through line 2—2 of FIG. 1;

FIG. 3 is a view, in section, showing another rake assembly in accordance with the present invention; and FIG. 4 is an exploded view, in section, of another example of a rake assembly in accordance with the present invention.

DESCRIPTION OF THE INVENTION

Referring now to FIG. 1 of the drawings which illustrates one example of an apparatus in accordance with the present invention. The drawing shows a rake head assembly 1, in partially exploded view, where assembly 1 includes a rectangular base 1a having a bottom 2 and vertically extending side walls 3a and 3b defining a generaly rectangular chamber. Selectively spaced openings 4 are provided in bottom 2 and are arranged as shown to provide generally parallel rows of openings 4a, 4b and 4c. As shown, the openings of the different rows can be staggered so that with respect to a view taken along the transverse axis of base 1a, the openings 4a of one row are disposed between the openings 4b of the adjacent row of openings to reduce the distance between openings 4b of the adjacent slots with respect to a view taken along a transverse axis of rake head 1.

Base 1a of rake head 1 can, for example be formed of molded plastic and can include ribs 6a and 6b as shown to secure rake teeth in rake head 1, as hereinafter described. Ribs 6a and 6b can, advantageously, be the same depth as sidewalls 3a and 3b to provide planar surface over the upper edges of sides 3a and 3b and ribs 6. Ribs 6a can be disposed within base 1a to extend in spaced mutually parallel spaced relation and so that each rib 6a extends from an opening 4a to an openings 4c as shown. Likewise ribs 6b can be disposed in base 1a in mutually parallel spaced relation when each rib 6b extends from sidewall 3b to an opening 4b in bottom 2 of base 1a. Grooves 8 are provided in each rib 6, where each groove is aligned with one of the rows of openings 4a–c, as shown in FIG. 1, and each groove 8 is adapted to receive rake teeth supports as described hereinafter.

As shown in FIG. 1, a reinforcing ring, which can be for example be an additional thickness of material from which the base 1a is made, can be provided around the periphery of each of the openings 4a–c, to provide additional reinforcement.

In accordance with another feature of the present invention as shown in FIG. 1, rake teeth assemblies 9a–c are provided for each row of openings 4a–c of base 1a where each assembly 9 includes teeth 11 advantageously spaced along and fixed to a shaft 10 to extend from shaft 10 in generally mutually parallel relationship in a plane extending through shaft 10 where the spacing between adjacent teeth 11 is equal to the spacing between individual openings 4a –c of base 1a, so that the teeth member of each assembly 9 can be inserted through the openings 4a–c of any of the rows of openings in base 1a. Advantageously, the diameter of teeth 11 is less than the diameter of openings 4a–c in base 1a through which teeth 11 are inserted so movement of teeth 11 in base 1a is limited by the diameter of openings 4a–c. Likewise, it will be noted that when each teeth assembly 9 rests in groove 8 of one set of the ribs 6a–b provided in base 1a, whereby shaft 10 is freely disposed to pivot in grooves 8 to permit movement of teeth 11 with respect to base 1a to the teeth assembly 9 can be for example, be molded of plastic and, advantageously can be sufficiently flexible to be momentarily deformed if an obstruction to movement of teeth is encountered.

As shown in FIG. 1, rake head assembly 1 includes a top 1b which is adapted to be received on the upper edges of sides 3a and 3b and ribs 6a and 6b of base 1a of rake head assembly. Top 1b can be secured to bottom 1a by gluing or other commonly accepted means such as threaded fasteners 12a inserted through openings 12 of top 1b. Top 1b advantageously contacts the upper edges of ribs 6a–b to hold shaft 10 each rake teeth assembly 9 while retaining teeth assembly 9 in grooves 8.

A swivel socket assembly 14 providing an opening 17 to receive a handle for movement of rake assembly 1 over the surface to be raked can be fastened to top 1b by bearings 15 adapted to receive shaft 16 of socket assembly 14. Socket assembly 14 is, advantageously, loosely retained for pivotal movement in bearings 15.

Referring now to FIG. 2 of the drawings which provide a sectional view of the rake assembly shown in the FIG. 1. The shadow lines 13 and 13a of FIG. 2 illustrate the extent of pivotal movement of teeth 11 within slots 4 provided in bottom 2 of base 1a. As can be seen in FIG. 2, teeth 11 are free to move through an arc determined by the size of openings 4a–c of base 1a in response to movement of head assembly 1 over a surface to be raked. Grooves 8 which carry shaft 10 rake teeth assembly 9 to prevent movement of the teeth assembly 9 along the transverse axis of rake head assembly 1, in response to change of movement of the rake head 1. Moreover, since each tooth 11 of each rake teeth assembly 9 extended through a selected openings 4a–c of bottom 2 of base 1a prevent lateral movement of the teeth assembly within base 1a is likewise prevented.

It is recognized that while the example shown in FIGS. 1 and 2 illustrate an arrangement where each tooth assembly 9 extends substantially the entire length of base 1a, within the scope of the present invention, a multiplicity of shorter rake teeth assemblies 9 (not shown) could be provided so within a given row of openings 4a–c a portion of the row of teeth would be independently moveable with respect to the teeth of the remainder of the row.

Likewise, within the scope of the present invention, a flexible membrane (not shown) could be stretched over the selected openings 4 of the base 1a of rake head assembly 1 and teeth 11 could be extended through an aperture in the openings provided in the flexible membrane whereby, in the absence of any movement of the rake head 1, the teeth 11 would be urged to preselected position determined by the position of the aperture in the flexible membrane. In such arrangement teeth 11 of each rake assembly 9 would be disposed in a selected "at rest" position in the absence of any force acting on teeth 11 as a result of movement of rake head 1.

The example of the present invention shown in FIG. 4, provides a rake head assembly 21 including a top 22 and a base member 23. The device in accordance with the present invention, as shown in FIG. 4 can advantageously, be made of a material such as wood. Base 23 provides upward extending lips 25 around the periphery of base 23 to define a generally rectangular chamber, as shown. A multiplicity of holes 24 are provided in the bottom 23a of base 23 and are selectively spaced in parallel rows whereby the holes of one row are staggered with respect to the holes and are adjacent row, as shown.

Rake teeth 26 are provided to be inserted through holes 24 of base member 23 where the diameter of each hole, is greater than the diameter of rake teeth 26 so that rake teeth 26 are freely and pivotably movable within the openings 24.

Wire pins 28 are provided to be inserted through holes 24 advantageously provided in teeth 26 to retain teeth 26 in the holes provided in base 27 and retain the upper portion of teeth 26 in the chamber defined by, base 23 and the upwardly extending lips 25 of base 23 for pivotal movement in openings 24 in response to movement of rake head assembly 2 over the surface to be raked.

Top 27 is provided to be fastened to base 23 and to contact the perimeter of lips 25 to provide a top for the chamber defined by lips 25 and base 23. Top 29 is secured to base 23 of rake head assembly 21 by means of threaded fasteners, with top 29 in place on base 23 teeth 26 are retained in the chamber defined by base 23 and upwardly extending lips 25 by means of top 29 and pins 27. Thus in the assembly shown in FIG. 4, as in the example shown in FIG. 1, rake teeth 26 retained by the rake head assembly 21 and are freely and pivotably movable in openings 24 of base member 23 in response to the movement of head assembly 21 over a surface to be raked.

Referring now to FIG. 3 which illustrates, in section, another example of a rake head assembly within the scope of the present invention, rake head assembly 31 is provided and is adapted to receive a source of vacuum for removal of foreign material separated from the surface to be raked as hereinafter described. The example of the device shown in the example of FIG. 4 includes a base member 31 having a bottom 32 with sidewalls 33 and a top 34 defining a chamber within the rake head assembly. As in the example of FIG. 1, base member 31 provides ribs having slots 37 where the rib assembly acts as a retainer for teeth assembly 39 similar to teeth assembly 9 of FIG. 1, and slots 40 are provided in bottom 32 of base 31 to permit pivotal movement of teeth 31 with respect to rake head assembly 31. A socket 42 is provided to receive a source of vacuum 43, for example the hose of a vacuum cleaner.

Socket 42 communicates with a duct 45 defined in rake head assembly 31 between spaced parallel walls 44 extending through rake head assembly 31 and extending parallel to the longitudinal axis of base 31. Duct 45 communicates with a source of vacuum (not shown) for removal of loose material from the underside of rake head assembly 31 as the teeth of head assembly 31 is moved over the surface to be raked.

The foregoing are but a few examples of apparatus in accordance with the present invention and it is recognized that various features of the present invention will become obvious to those skilled in the art upon reading the disclosure set forth hereinbefore. Accordingly, it is intended that the scope of the present invention be limited only to be the claims appended hereto.

I claim:

1. A rake means including: a base number including a multiplicity of selectively spaced apertures of selected width in one side thereof; a multiplicity of elongate spaced tooth members of substantially equal length having a diameter less than the width of said apertures of said base member; pivot means to pivotably connect selected tooth members to said base member and dispose selected tooth members to extend through said apertures outwardly from one side of said base member, said tooth members being arranged to provide at least two rows of tooth members; said tooth members contacting a surface to be raked to support the base member above the surface to be raked so each tooth member can pivot from a first position contacting one side of its respective said apertures to a second position contacting a second side of said apertures in response to movement of said base member over a surface to be raked; and a vacuum tube member carried by said base member adapted to be connected to a source of suction to remove materials released from said surface by movement of said tooth members over said surface.

* * * * *